United States Patent
Mack et al.

(10) Patent No.: US 6,784,272 B2
(45) Date of Patent: Aug. 31, 2004

(54) METAL-FREE SILANE-TERMINATED POLYURETHANES, A PROCESS FOR THEIR PREPARATION AND THEIR USE

(75) Inventors: Helmut Mack, Rheinfelden (DE); Dieter Barfurth, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/108,502

(22) Filed: Mar. 29, 2002

(65) Prior Publication Data

US 2002/0188068 A1 Dec. 12, 2002

(30) Foreign Application Priority Data

Mar. 29, 2001 (DE) .......................... 101 15 698

(51) Int. Cl.$^7$ .............................. C08G 77/26
(52) U.S. Cl. .......................... 528/28; 528/38
(58) Field of Search ..................... 528/28, 38

(56) References Cited

U.S. PATENT DOCUMENTS

| | | | | |
|---|---|---|---|---|
| 3,895,043 A | * | 7/1975 | Wagner et al. | |
| 4,020,043 A | * | 4/1977 | Siefken | |
| 4,067,844 A | * | 1/1978 | Barron et al. | 525/453 |
| 4,345,053 A | * | 8/1982 | Rizk et al. | 525/440 |
| 4,645,816 A | * | 2/1987 | Pohl et al. | 528/28 |

FOREIGN PATENT DOCUMENTS

| | | |
|---|---|---|
| DE | 2 307 794 | 8/1973 |
| EP | 0 676 403 A1 | 10/1995 |
| FR | 2 158 561 | 6/1973 |
| WO | WO 98/36007 | 8/1998 |

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A metal-free, in particular tin-free, silane-terminated polyurethane which is useful in adhesives or sealant compositions is obtained by reacting at least one aliphatic secondary aminoalkylalkoxysilane of formula (Ia)

$$R-NH-(CH_2)_3Si(R^1)_x(OR^2)_{(3-x)} \quad (Ia)$$

or at least one aliphatic secondary aminoalkylalkoxysilane of formula (Ib)

$$R-NH-CH_2-CH(R^1)-CH_2-Si(R^1)_x(OR^2)_{(3-x)} \quad (Ib)$$

wherein in the formulae (Ia) and (Ib), R is a linear or branched alkyl group having 1 to 18 C atoms, $R^1$ is a methyl group, $R^2$ is a methyl or ethyl group and x is 0 or 1, with a polyurethane prepolymer having at least one terminal isocyanate group in the absence of a metal catalyst.

13 Claims, No Drawings

METAL-FREE SILANE-TERMINATED POLYURETHANES, A PROCESS FOR THEIR PREPARATION AND THEIR USE

BACKGROUND OF THE INVENTION

1. Field of the Invention

The present invention relates to a silane-terminated polyurethane, a process for its preparation and its use.

2. Discussion of the Background

In the building industry, joints serve for compensating movements between individual structural elements. Such movements are caused, for example, by thermal expansion or settling processes. As a rule, joints are sealed using sealing compounds, for example according to DIN EN ISO 1 1600. In addition to the sealing function, sealing compounds must also compensate movements due to elastic deformation. Base polymers used for the preparation of the sealing compounds are silicones, acrylates, butyl rubbers, polysulfides, polyurethanes and MS polymers. Silane-crosslinking polyurethanes are new for this application.

The reaction of secondary aminosilanes with isocyanate-containing polyurethane prepolymers leads to silane-terminated polyurethanes which can be crosslinked by means of moisture. The crosslinking of corresponding sealing compounds and adhesive materials can be accelerated by adding a catalyst.

Conventional isocyanate-containing polyurethane prepolymers are generally obtained from polyols, which are mostly synthesized from ethylene oxide and/or propylene oxide, and aliphatic or aromatic isocyanates.

The reaction of isocyanate-containing polyurethane prepolymers with aliphatic or aromatic secondary aminosilanes is catalyzed by tin compounds. The reaction gives silane-terminated polyurethanes for adhesive and sealant applications, as described, for example, in EP 0 676 403 A1.

Alternatively, isocyanatosilanes, such as, for example, $OCN-(CH_2)_3Si(X)_3$, where X is an alkoxy group, such as methoxy or ethoxy, can also be reacted with hydroxyl-containing polyurethane prepolymers to give silane-terminated polyurethanes (U.S. Pat. No. 4,345,053). No gaseous byproduct is liberated during the silane crosslinking, compared to the case of the classical urethane crosslinking. Thus, isocyanate-free systems, such as coating compositions, finishes, adhesives and sealing compounds can be substantially safely formulated since volatile isocyanate monomers, e.g. tolylene diisocyanate (TDI), are suspected of being very harmful to health.

SUMMARY OF THE INVENTION

It is the object of the present invention to provide an improved silane-terminated polyurethane, in particular for adhesive and sealant applications.

This and other objects are achieved according to the present invention, the first embodiment of which includes an adhesive material or sealing compound, comprising: a metal-free silane-terminated polyurethane.

A further embodiment includes a method of making an adhesive material or sealing compound, comprising:
mixing a metal-free silane-terminated polyurethane polyurethane with a plasticizer and optionally a filler.

Another embodiment of the present invention includes a metal-free silane-terminated polyurethane, obtained by reacting at least one aliphatic secondary aminoalkylalkoxysilane of formula (Ia)

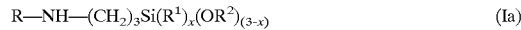

or at least one aliphatic secondary aminoalkylalkoxysilane of formula (Ib)

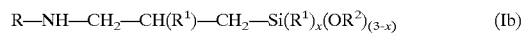

wherein in formulae (Ia) and (Ib), R is a linear or branched alkyl group having 1 to 18 C atoms, $R^1$ is a methyl group, $R^2$ is a methyl or ethyl group and x is 0 or 1,
with a polyurethane prepolymer in the absence of a metal catalyst;
wherein the polyurethane prepolymer has at least one terminal isocyanate group.

In yet another embodiment the present invention relates to a process for the preparation of a metal-free silane-terminated polyurethane, comprising:
reacting at least one aliphatic secondary aminoalkylalkoxysilane of formula (Ia)

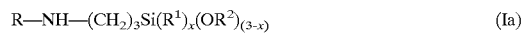

or at least one aliphatic secondary aminoalkylalkoxysilane of formula (Ib)

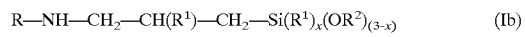

wherein in the formulae (Ia) and (Ib), R is a linear or branched alkyl group having 1 to 18 C atoms, $R^1$ is a methyl group, $R^2$ is a methyl or ethyl group and x is 0 or 1:
with a polyurethane prepolymer in the absence of a metal catalyst;
wherein the polyurethane prepolymer carries at least one terminal isocyanate group.

DETAILED DESCRIPTION OF THE INVENTION

Surprisingly, it was found that the reaction of an aliphatic secondary aminosilane of formulae (Ia) or (Ib) with an isocyanate-containing polyurethane prepolymers in the absence of a metal catalyst, in particular of a tin catalyst, leads to a colorless and low-viscosity silane-terminated polyurethane:

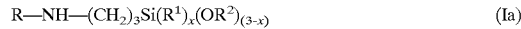

or at least one aliphatic secondary aminoalkylalkoxysilane of formula (Ib)

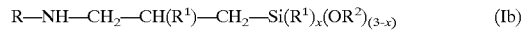

wherein in formulae (Ia) and (Ib), R is a linear or branched alkyl group having 1 to 18 C atoms, $R^1$ is a methyl group, $R^2$ is a methyl or ethyl group and x is 0 or 1.

A metal catalyst, such as, for example, dibutyltin dilaurate (DBTL), is not necessary for the present silane termination reaction. This is advantageous because the thermal cleavage of —NR—CO—NR— groups is promoted in particular by a high content of tin compounds.

According to the present invention, a low-viscosity, metal-free silane-terminated polyurethane can be formulated in a simple and economical manner with a further additive, such as a filler, a plasticizer, a thixotropic agent, a stabilizer, a pigment, etc., to give an adhesive or a sealing compounds.

In addition, the productivity of the prepolymer preparation increases due to the shorter pot lives in the silane termination reaction.

Moreover, a silane-terminated polyurethane prepared according to the present invention is particularly environmentally compatible because it is substantially free of residues of metal catalysts, i.e. metal-free.

The rapid reaction of an isocyanate group of the polyurethane prepolymer with a secondary aliphatic aminosilane of formulae (Ia) or (Ib) is preferred in the preparation of the silane-terminated polyurethane. Preferably DYNASYLAN® 1189 is used as secondary aliphatic aminosilane. The reaction proceeds according to the equation:

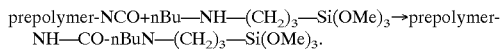
prepolymer-NCO+nBu—NH—(CH$_2$)$_3$—Si(OMe)$_3$→prepolymer-NH—CO-nBuN—(CH$_2$)$_3$—Si(OMe)$_3$.

The possible, but undesired, chain-lengthening secondary reaction—undesired because it increases the viscosity—is not observed in the process according to the invention. Thus, the chain-lengthening secondary reaction is effectively suppressed:

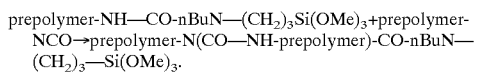
prepolymer-NH—CO-nBuN—(CH$_2$)$_3$Si(OMe)$_3$+prepolymer-NCO→prepolymer-N(CO—NH-prepolymer)-CO-nBuN—(CH$_2$)$_3$—Si(OMe)$_3$.

The present invention thus relates to a metal-free, in particular tin-free, silane-terminated polyurethane for an adhesive material or a sealing compound.

The present invention furthermore relates to a metal-free silane-terminated polyurethane which is obtained by reacting at least one aliphatic secondary aminoalkylalkoxysilane of formula (Ia)

$$R\text{—}NH\text{—}(CH_2)_3Si(R^1)_x(OR^2)_{(3-x)} \tag{Ia}$$

or at least one aliphatic secondary aminoalkylalkoxysilane of formula (Ib)

$$R\text{—}NH\text{—}CH_2\text{—}CH(R^1)\text{—}CH_2\text{—}Si(R^1)_x(OR^2)_{(3-x)} \tag{Ib}$$

wherein in the formulae (Ia) and (Ib), R is a linear, branched or cyclic alkyl group preferably cyclohexyl, having 1 to 18 C atoms, preferably having 1 to 6 C atoms, $R^1$ is a methyl group, $R^2$ is a methyl or ethyl group and x is 0 or 1, with a polyurethane prepolymer having at least one terminal isocyanate group in the absence of a metal catalyst.

Preferably, the reaction of the aliphatic secondary aminoalkylalkoxysilane with the polyurethane prepolymer is carried out in the absence of a tin catalyst. Conventionally, dibutyltin dilaurate (DBTL) or another dialkyltin dicarboxylate compound is used as a tin catalyst.

Preferred secondary aminoalkylalkoxysilanes are N-(n-butyl)-3-aminopropyltrimethoxysilane, N-(n-butyl)-3-aminopropyltriethoxysilane, N-(n-butyl)-3-aminopropylmethyldimethoxysilane, N-(n-butyl)-3-aminopropylmethyldiethoxysilane, N-(n-butyl)-3-amino-2-methylpropyltrimethoxysilane, N-(n-butyl)-3-amino-2-methylpropyltriethoxysilane or N-ethyl-3-amino-2-methylpropyltrimethoxysilane.

Within the meaning of the present invention a polyurethane prepolymer is defined as a reaction product of a diol, for example a so-called polyetherpolyol, such as a polyethylene oxide or a polypropylene oxide, having a terminal hydroxyl group and a molecular weight of from 200 to 2000 g/mol, or a polyol, i.e. a polyetherpolyol or a polyesterpolyol, or a mixture thereof and at least one diisocyanate. Preferably, an excess of diisocyanate is used so that the polyurethane prepolymer contains a terminal isocyanate (NCO) group. The diol/polyol component of the polyurethane prepolymer may have both a polyether and a polyester structure of variable molecular weight.

Both aliphatic compounds, e.g. isophorone diisocyanate (IPDI) or hexamethylene diisocyanate (HDI), and aromatic compounds, e.g. tolylene diisocyanate (TDI) or diphenylmethane diisocyanate (MDI) are preferred for use as diisocyanates.

According to the invention, a polyurethane prepolymer based on an aliphatic diisocyanate, preferably isophorone diisocyanate (IPDI) or hexamethylene diisocyanate (HDI), is furthermore preferred. Diphenylmethane diisocyanate (MDI) is preferred as polyurethane prepolymer based on an aromatic diisocyanate.

In addition, the present invention relates to the process for the preparation of a metal-free silane-terminated polyurethane, in which at least one aliphatic secondary aminoalkylalkoxysilane of formula (Ia)

$$R\text{—}NH\text{—}(CH_2)_3Si(R^1)_x(OR^2)_{(3-x)} \tag{Ia}$$

or at least one aliphatic secondary aminoalkylalkoxysilane of formula (Ib)

$$R\text{—}NH\text{—}CH_2\text{—}CH(R^1)\text{—}CH_2\text{—}Si(R^1)_x(OR^2)_{(3-x)} \tag{Ib}$$

wherein in the formulae (Ia) and (Ib), R is a linear or branched alkyl group having 1 to 18 C atoms, $R^1$ is a methyl group, $R^2$ is a methyl or ethyl group and x is 0 or 1, is reacted with a polyurethane prepolymer having a terminal isocyanate group in the absence of a metal catalyst. The metal-free, preferably tin-free, silane-terminated polyurethane according to the invention is preferably used for adhesive and sealant applications.

Preferably, the process according to the invention is carried out as follows:

An anhydrous mixture of polyetherdiol and polyethertriol can be mixed with a diisocyanate at from about 30 to 40° C. to prepare the prepolymer. The reaction is preferably carried out under inert gas and under exclusion of water. Preferably, the mixture is allowed to react at about 70° C. until a constant isocyanate (NCO) content is reached. Preferably, the NCO content is analyzed during the reaction. The reaction mixture may furthermore contain a diluent or solvent, which is preferably inert, for example toluene. Depending on the NCO content, a secondary aminosilane can now be added.

The reaction of the polyurethane prepolymer with the secondary aminosilane is preferably carried out at from 25 to 80° C. The secondary aminosilane is preferably added in an excess of from 5 to 25 mol %.

The batch is preferably stirred at a temperature in the range of from 60 to 75° C., in particular at about 70° C., until NCO is no longer detectable.

Furthermore, a "water scavenger", for example an organofunctional alkoxysilane, preferably vinyltrimethoxysilane or vinyltriethoxysilane, may be added to the reaction mixture.

A metal catalyst-free, silane-terminated polyurethane according to the invention, which can advantageously be used as a starting material in formulations for adhesive and sealant applications, is thus obtained.

Products according to the invention are usually colorless and have a low viscosity.

Commercial comparative products, i.e. polyurethanes according to the prior art (see Comparative Example), generally have a viscosity in the range from 30 000 to 60 000 mpa·s.

In comparison, polyurethanes according to the invention preferably have a viscosity of from 12 000 to 25 000 mpa·s, particularly preferably from 15 000 to 20 000 mpa·s (viscosity values at 25° C. according to DIN 53 015).

Silane-terminated polyurethanes according to the invention can be used for the preparation of formulations for adhesive and sealant applications. The silane-terminated polyurethane according to the invention can be used as base material. For this purpose, the polyurethane is initially introduced and is first mixed with plasticizer. This is preferably followed by incorporation of the filler with subsequent degassing of the material. Drying it agent, adhesion promoter and other additives can then be added. The material is usually thoroughly mixed and filled into cartridges or other suitable carriers.

Adhesives and sealing compounds based on silane-terminated polyurethanes preferably also contain the following components in addition to the silane-terminated polyurethanes:

a filler and/or pigment, a plasticizer, a drying agent, an adhesion promoter, a Theological additive, for example for producing thixotropic properties, a stabilizer and a preservative.

Having generally described this invention, a further understanding can be obtained by reference to certain specific examples which are provided herein for purposes of illustration only, and are not intended to be limiting unless otherwise specified.

EXAMPLES

Example 1

Preparation of a Metal-free Silane-terminated Polyurethane

A mixture of polyetherdiol and polyethertriol was weighed into the reaction flask under nitrogen. In order to eliminate traces of water, the batch was heated to 100° C. and was treated at this temperature for 30 minutes in the nitrogen stream. After cooling to 30 to 40° C., diphenylmethane diisocyanate (MDI) (1.5 mole of NCO per mole of OH) was added while blanketing with nitrogen and stirring vigorously, and slow heating to 70° C. was then effected. The temperature was maintained until a constant isocyanate (NCO) content was reached (about 5 to 6 hours). The NCO content was determined by titration according to DIN 53 185.

According to the NCO content, an excess of N-(n-butyl)-3-aminopropyltrimethoxysilane and vinyltrimethoxysilane (serves as a water scavenger) was added dropwise at 50° C. in the second reaction stage. The batch was initially viscous and had to be heated to 70° C. Stirring was continued until free NCO is no longer detectable. The material is then filled, while still warm, into containers flushed with nitrogen.

Properties of the metal-free silane-terminated polyurethane according to Example 1:

| Viscosity in mPa.s (DIN 53 015) | Nitrogen content in % by weight | Silicon content in % by weight | Color number (APHA, ISO 6271) |
|---|---|---|---|
| 15 650 | 2.1 | 1.2 | 110 |

Example 2

Kinetics of the Reaction of a Polyurethane Prepolymer with Secondary Aminosilanes A polyurethane prepolymer prepared from a polyether-polyol (molecular weight 600) and MDI (diphenylmethane diisocyanate) was initially introduced as a 0.1 molar solution in toluene and was heated to 60° C. Thereafter, a stoichiometric amount of secondary aminosilane was added and the reaction was monitored by sampling and titration of the isocyanate (NCO) content. In addition, the temperature change was recorded.

Results:

| Secondary aminosilane | Temperature increase (° C.) | Half-life (min) | Conversion after end of reaction (%) |
|---|---|---|---|
| N-Butylaminosilane | 3.4 | 0.2 | 88.2 |
| Comparative experiment: N-Phenylaminosilane | 0.5 | 37.5 | 80.5 |

Example 3

Preparation of a Sealing Compound for Metal-free Silane-terminated Polyurethane 274 g of silane-terminated polyurethane from Example 1 and 97 g of plasticizer (diisodecyl phthalate) were weighed into the working vessel (1 liter can) of a laboratory planetary mixer (LABMAX®, manufacturer: MOLTENI) and mixed for 10 minutes at 200 rpm. 347 g of chalk (surface-treated with stearic acid, dried for 16 hours at 110° C.) were then incorporated into the polyurethane/plasticizer mixture. After the addition of chalk is complete, the pressure in the working space of the mixer was reduced to 100 mbar and volatile components were thus removed from the material in the course of 15 minutes. Thereafter, 11 g of silane drying agent (DYNASYLAN® VTMO, vinyltrimethoxysilane) and 7 g of silane adhesion promoter (DYNASYLAN® DAMO-T, diaminopropyltrimethoxysilane) were added and the pressure was once again reduced to 100 mbar while stirring. After a treatment time of 10 minutes, 0.15 g of tin catalyst (METATIN® 740, di-n-butyltin diketonate; manufacturer: ACIMA) was added, stirring was effected for a further 10 minutes and the can containing the material was then removed from the mixer. The prepared sealing compound was transferred from the mixing can into cartridges.

Example 4

Testing of the Sealing Compounds from Example 3

| Sealing comnpound | Thorough drying after 7 days (mm) | Adhesion to glass | Adhesion to aluminum | Adhesion to PVC |
|---|---|---|---|---|
| According to the invention and according to Example 3 | 6 | very good | very good | very good |
| From comparative experiment according to Example 3 | 5 | good | good | good |

The German patent application 101 15 698.7, filed Mar. 29, 2001, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A metal-free silane-terminated polyurethane, obtained by reacting at least one aliphatic secondary aminoalkylalkoxysilane of formula (Ia)

$$R\text{—}NH\text{—}(CH_2)_3Si(R^1)(OR^2)_2 \quad \text{(Ia)}$$

or at least one aliphatic secondary aminoalkylalkoxysilane of formula (Ib)

$$R\text{—}NH\text{—}CH_2\text{—}CH(R^1)\text{—}CH_2\text{—}SiR^1(OR^2)_2 \quad \text{(Ib)}$$

wherein in formulae (Ia) and (Ib), R is a linear or branched or cyclic alkyl group having 1 to 18 C atoms, $R^1$ is a methyl group, $R^2$ is a methyl or ethyl group, with a polyurethane prepolymer in the absence of a metal catalyst;

wherein the polyurethane prepolymer has at least one terminal isocyanate group.

2. The polyurethane as claimed in claim 1, wherein the reaction of the aliphatic secondary aminoalkylalkoxysilane with a polyurethane prepolymer is carried out in the absence of a tin catalyst.

3. The polyurethane as claimed in claim 1, wherein the secondary aminoalkylalkoxysilane is N-(n-butyl)-3-aminopropylmethyldimethoxysilane or N-(n-butyl)-3-aminopropylmethyldiethoxysilane.

4. The polyurethane as claimed in claim 1, wherein the polyurethane prepolymer is based on isophorone diisocyanate, hexamethylene diisocyanate, tolylene diisocyanate, diphenylmethane diisocyanate or a mixture thereof.

5. The polyurethane according to claim 1, wherein said polyurethane is substantially free of tin.

6. The polyurethane according to claim 1, wherein said polyurethane has a viscosity of from 12,000 to 25,000 mPa·s at 25° C.

7. The polyurethane according to claim 1, which is colorless.

8. A process for the preparation of a metal-free silane-terminated polyurethane, comprising:

reacting at least one aliphatic secondary aminoalkylalkoxysilane of formula (Ia)

$$R\text{—}NH\text{—}(CH_2)_3Si(R^1)(OR^2)_2 \quad \text{(Ia)}$$

or at least one aliphatic secondary aminoalkylalkoxysilane of formula (Ib)

$$R\text{—}NH\text{—}CH_2\text{—}CH(R^1)\text{—}CH_2\text{—}SiR^1(OR^2)_2 \quad \text{(Ib)}$$

wherein in the formulae (Ia) and (Ib), R is a linear or branched or cyclic alkyl group having 1 to 18 C atoms, $R^1$ is a methyl group, $R^2$ is a methyl or ethyl group with a polyurethane prepolymer in the absence of a metal catalyst;

wherein the polyurethane prepolymer carries at least one terminal isocyanate group.

9. The process as claimed in claim 8, wherein the secondary aminoalkylalkoxysilane is N-(n-butyl)-3-aminopropylmethyldimethoxysilane or N-(n-butyl)-3-aminopropylmethyldiethoxysilane.

10. The process as claimed in claim 8, wherein the polyurethane prepolymer is based on isophorone diisocyanate, hexamethylene diisocyanate, tolylene diisocyanate, diphenylmethane diisocyanate or a mixture thereof.

11. The process according to claim 8, wherein said polyurethane is substantially free of tin.

12. The process according to claim 8, wherein said polyurethane has a viscosity of from 12,000 to 25,000 mPa·s at 25° C.

13. The process according to claim 8, wherein the metal-free silane-terminated polyurethane is colorless.

* * * * *